(12) United States Patent
Ju

(10) Patent No.: US 7,880,896 B2
(45) Date of Patent: Feb. 1, 2011

(54) INTERFEROMETER USING VERTICAL-CAVITY SURFACE-EMITTING LASERS

(75) Inventor: Young-Gu Ju, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 0 days.

(21) Appl. No.: 12/384,837

(22) Filed: Feb. 10, 2009

(65) Prior Publication Data

US 2009/0201509 A1    Aug. 13, 2009

Related U.S. Application Data

(62) Division of application No. 11/710,565, filed on Feb. 26, 2007.

(30) Foreign Application Priority Data

May 15, 2006   (KR) ............... 10-2006-0043198

(51) Int. Cl.
    *G01B 11/02*     (2006.01)
(52) U.S. Cl. .................................. 356/499
(58) Field of Classification Search ........... 356/499, 356/521, 488, 494
See application file for complete search history.

(56) References Cited

U.S. PATENT DOCUMENTS

| | | | |
|---|---|---|---|
| 3,171,881 A | 3/1965 | Morokuma | |
| 4,027,976 A | 6/1977 | Amon | |
| 4,714,339 A | 12/1987 | Lau et al. | |
| 4,806,778 A | 2/1989 | Yamamoto et al. | |
| 5,067,813 A | 11/1991 | Ishizuka et al. | |
| 6,141,101 A | 10/2000 | Bleier et al. | |
| 6,429,940 B1 * | 8/2002 | Willhelm | 356/499 |
| 6,483,593 B1 | 11/2002 | Bell et al. | |
| 2003/0164948 A1 | 9/2003 | Hill | |
| 2005/0073690 A1 * | 4/2005 | Abbink et al. | 356/451 |
| 2005/0259270 A1 | 11/2005 | Pocha et al. | |
| 2006/0232781 A1 | 10/2006 | Kranz et al. | |
| 2007/0109547 A1 | 5/2007 | Jungwirth | |
| 2007/0223007 A1 * | 9/2007 | Klaver et al. | 356/499 |

* cited by examiner

*Primary Examiner*—Tarifur Chowdhury
*Assistant Examiner*—Jonathon D Cook
(74) *Attorney, Agent, or Firm*—Foley & Lardner LLP

(57) ABSTRACT

An interferometer which incorporates a single mode VCSEL to facilitate miniaturization through integration of parts. The interferometer includes a beam splitter for partially reflecting and transmitting light; a single mode vertical-cavity surface-emitting laser for generating a beam of light perpendicular to a wafer; a first mirror fixedly perpendicular to the first path to reflect the portion of light reflected from the beam splitter; a second mirror movably arranged along the second path to reflect the beam portion transmitted through the beam splitter. A photodetector arranged along the second path detects the beam portion reflected from the first mirror and transmitted again through the beam splitter and the beam portion reflected from the second mirror and reflected again from the beam splitter to locate the second mirror based on an interference fringe created by a difference in the paths between the two beam portions.

3 Claims, 2 Drawing Sheets

INTERFEROMETER USING VERTICAL-CAVITY SURFACE-EMITTING LASERS

CROSS REFERENCE TO RELATED APPLICATION

This application is a division of U.S. Ser. No. 11/710,565, filed Feb. 26, 2007, which claims the benefit of Korean Patent Application No. 2006-0043198 filed on May 15, 2006, in the Korean Intellectual Property Office, the disclosure of which is incorporated herein by reference.

BACKGROUND OF THE INVENTION

1. Field of the Invention

The present invention relates to an interferometer using a vertical-cavity surface-emitting laser (VCSEL), and more particularly, to an interferometer which incorporates a single mode VCSEL to facilitate miniaturization through integration of parts, save manufacturing cost, and improve precision.

2. Description of the Related Art

An interferometer is an optical device utilizing superposition of wave which has a long history. Before the invention of the laser, pseudo-monochromatic light had been produced by transmitting light from a mercury lamp or natural light through a filter in order to create an interference fringe. After the introduction of the laser, the interferometer has been relatively simplified in design and improved in coherence, which makes the interference fringe to be observed relatively easier. Examining a Michelson interferometer for example, this type of interferometer can be composed of one laser, two mirrors and a photodetector or screen.

A laser used as a light source should have a single frequency to obtain an interference fringe that is temporally still. For this purpose, a gas laser such as a He—Ne laser is widely used. In case of a solid laser or semiconductor laser having a wide optical gain bandwidth, a separate technology such as external feedback for filtering in a transverse or longitudinal mode is required to produce a single wavelength. Such an interferometer is generally used for precision length measurement, and particularly, as a location sensor in an event of actuating a precision stage. According to properties of the interferometer, when there is one wavelength difference between two optical paths, the final interference fringe is shifted by one period. Generally, one of the optical paths is fixed but the other one is attached to a movable stage so that the movement of the stage can be measured more precisely.

However, existing interferometers adopt a gas laser, which increases the volume of an optical system. This makes it difficult to miniaturize the location sensor using an interferometer. In case of semiconductor lasers, a distributed Bragg mirror structure can also be applied to an edge emitting laser to realize a light source of an interferometer, acting in a single mode. However, this type of laser is difficult and expensive to fabricate and thus can be rarely mass-produced.

SUMMARY OF THE INVENTION

The present invention has been made to solve the foregoing problems of the prior art and therefore an aspect of the invention is to provide an interferometer which incorporates a single mode VCSEL to facilitate miniaturization, save manufacturing cost, and further shorten optical path through integration of parts thereby improving precision.

Another aspect of the invention is to provide an interferometer which is realized through single optical alignment of parts and has a larger value of alignment tolerance over existing interferometers, thereby to save manufacturing cost over the existing interferometers while enabling miniature size.

According to an aspect of the invention, an interferometer includes a beam splitter for partially reflecting and transmitting light; a single mode vertical-cavity surface-emitting laser for generating a beam of light perpendicular to a wafer along a first path toward said beam splitter; a first mirror fixedly arranged in a position along a second path, which is perpendicular to the first path to reflect the portion of light reflected from the beam splitter; a second mirror movably arranged along the second path to reflect the beam portion transmitted through the beam splitter; and a photodetector arranged along the second path, the photodetector detecting the beam portion reflected from the first mirror and transmitted again through the beam splitter and the beam portion reflected from the second mirror and reflected again from the beam splitter to locate the second mirror based on an interference fringe created by a difference in the paths between the two beam portions.

Preferably, the vertical-cavity surface-emitting laser may be flip-chip bonded to a transmission substrate with a micro lens arranged thereon. The vertical-cavity surface-emitting laser may also comprise a micro lens arranged on a base substrate to emit the collimated beam through a rear portion of the vertical-cavity surface-emitting laser.

Preferably, the beam splitter may comprise a beam splitter cube with the first mirror arranged on a face thereof, the vertical-cavity surface-emitting laser is flip-chip bonded to an outer face of the beam splitter cube perpendicular to a surface where the first mirror is arranged, and the photodetector is flip-chip bonded to a face of the beam splitter cube opposing, on a same path, the face of the beam splitter cube where the first mirror is arranged.

More preferably, the first mirror may comprise a metal coat or a dielectric coat arranged on a face of the beam splitter cube.

According to another aspect of the invention, an interferometer includes a beam splitter for partially reflecting and transmitting light; a single mode vertical-cavity surface-emitting laser for generating a beam of light perpendicular to a wafer along a first path toward the beam splitter; a first mirror movably arranged in a position along a second path, which is perpendicular to the first path to reflect the portion of light reflected from the beam splitter; a second mirror fixedly arranged along the second path to reflect the beam portion transmitted through the beam splitter; and a photodetector arranged along the second path, the photodetector detecting the beam portion reflected from the first mirror and transmitted again through the beam splitter and the beam portion reflected from the second mirror and reflected again from the beam splitter to locate the first mirror based on an interference fringe created by a difference in the paths between the two beam portions.

Preferably, the beam splitter comprises a cube mirror with the second mirror arranged in a face of thereof, the single mode vertical-cavity surface-emitting laser is flip-chip bonded to an outer face of the beam splitter cube opposite to the face where the second mirror is arranged, and the photodetector is flip-chip bonded to a face of the beam splitter cube along the second path.

According to further another aspect of the invention, an interferometer includes a transparent substrate having a transmission grating and a reflection grating arranged on one side thereof, each of the transmission and reflection gratings adapted to form a zero order beam advancing straight and a first order beam diffracted at a predetermined angle, a single mode vertical-cavity surface-emitting laser for generating a beam of light perpendicular to a wafer, the vertical-cavity surface-emitting laser surface-mounted on the other side of the transparent substrate so that a portion of the beam passes through the transmission grating of the substrate; a mirror cube movably arranged on a path of the beam portion to displace the zero order beam transmitted through the transmission grating to a predetermined length in parallel and reflect the replaced zero order beam toward the reflection grating; and a photodetector arranged on paths of the first order beams from the transmission grating and from the reflection grating to detect the first order beam reflected from the mirror cube and diffracted by the diffraction grating of the substrate and the first order beam diffracted by the transmission grating thereby locating the mirror cube based on an interference fringe created by a difference in optical paths of the two first order beams.

Preferably, the transmission grating and the reflection grating may be arranged to have a same period so that the first beams directed toward the photodetector are set parallel with each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully hereinafter with reference to the accompanying drawings, in which preferred embodiments of the invention are shown.

Figure 1:
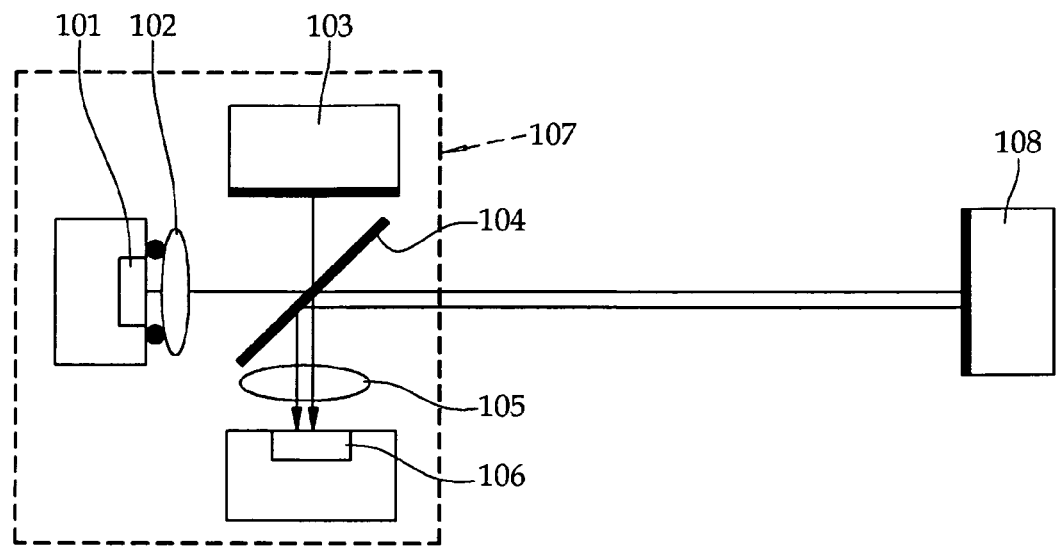
FIG. 1 is a conceptual view illustrating an interferometer according to a first embodiment of the invention.

This disclosure provides an example of a miniature interferometer realized by using a single mode VCSEL as a light source while utilizing a variety of merits of the VCSEL. FIG. 1 is a conceptual view illustrating an interferometer according to a first embodiment of the invention, in which a Michelson interferometer is realized by using a single mode VCSEL 101.

Light from the VCSEL 101 is converted into a collimated beam through a lens 102 and then reaches a beam splitter 104. According to the type of the beam splitter 104, the beam is divided into two portions at a specific ratio. The beam splitter 104 reflects the first beam portion toward a first mirror 103 while transmitting the second beam portion toward a second mirror 108. The first beam portion is reflected from the first mirror 103 toward the beam splitter 104, which transmits a specific ratio of the first beam portion to a photodetector 106. Likewise, the second beam portion reflected from the second mirror 108 is reflected again from the splitter 104 toward the photodetector 106. The beam portions, when combined at the photodetector 106 along two different paths, produce an interference fringe resulting from phase difference.

In this arrangement, where the interferometer module 107 is fabricated with the first mirror 103 fixed in a position adjacent to the VCSEL 101 or the photodetector 106 and the second mirror 108 is mounted on a movable stage, the optical path including the second mirror 108 is varied in response to the movement of the stage, thereby varying the interference fringe on the photodetector 106. As an alternative, it is also possible to fabricate the interferometer module with the second mirror 108 fixed and the first mirror mounted on a movable position. The interference fringe changes for one period when the optical path difference is varied for one wavelength. The optical strength of the interference fringe is varied along a sine curve, and a movement more delicate than the wavelength can be found by dividing the optical strength more minutely. A precise laser interferometer is known to detect a movement in nm level or minuter.

The single mode VCSEL 101 used in this embodiment is a type of semiconductor laser, constituting a (cavity) resonator in a direction vertical to a wafer unlike an edge-emitting laser. This type of semiconductor laser has a structure similar to that of a Light Emitting Diode (LED), and thus can be easily mass-produced in a two dimensional array. An aperture for emitting light may also be configured circular to produce a circular cross section beam so that a special optical system for modifying beams to have a circular cross section is not required any longer.

The edge emitting laser uses feedback effects resulting from a grating pattern formed in the length of the laser in order to produce a single mode. However, this structure requires high process precision and thus an optical device of this structure has drawbacks such as low yield, difficulty in mass production and high price. On the contrary, since the VCSEL is based on a micro-cavity resonator, its longitudinal mode interval is generally remote and thus one index is used to describe the longitudinal mode. Accordingly, a generally single mode beam can be produced by controlling the VCSEL according to one index for describing the longitudinal mode.

The single mode VCSEL 101, when constituted into an actual system, can provide several structures that the existing He—Ne or edge emitting laser cannot realize. As an example, the single mode VCSEL 101 can be integrated with a micro-optics such as a micro-lens and a Diffractive Optical Element (DOE) to constitute a micro-optical system. FIG. 1 shows an example where the micro lens 102 is integrated on the VCSEL 101. This structure can be realized by flip-chip bonding the VCSEL 101 onto a transmission substrate with a micro lens arranged thereon or providing a micro lens on the rear side of a base substrate of the VCSEL 101 so that collimated beam can emitted from the rear side of the laser.

The edge emitting laser is separately fabricated and then assembled with optics by means of external structures since beam-emitting plane is parallel with the wafer. The edge emitting laser emits a non-circular beam and thus needs a sophisticated optics to produce a circular beam. However, the VCSEL can emit a circular beam in a direction perpendicular to the wafer plane. Accordingly, application of the VCSEL 101 of this embodiment can produce an interferometer that is further simplified and miniaturized than the existing interferometers.

Figure 2:
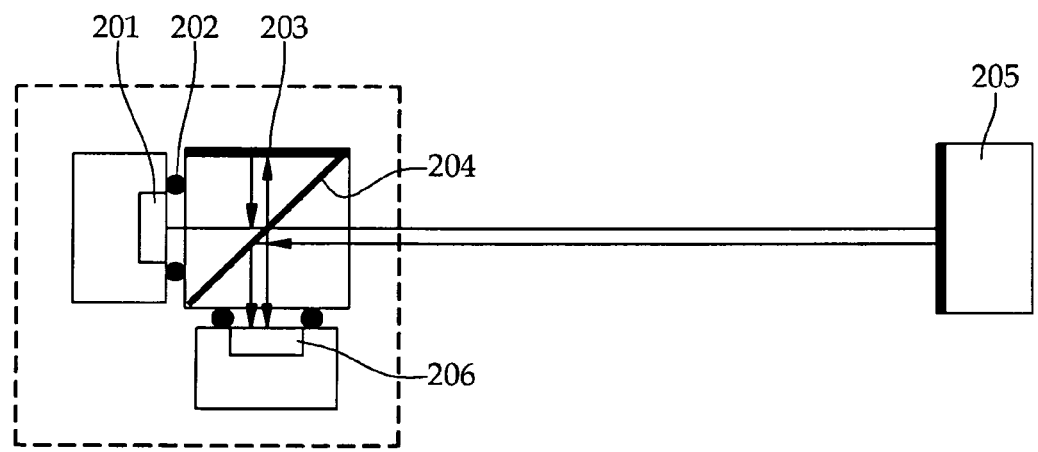
FIG. 2 is a conceptual view illustrating an interferometer according to a second embodiment of the invention.

FIG. 2 is a conceptual view illustrating an interferometer according to a second embodiment of the invention, which is further stabilized and miniaturized from that of the first embodiment. The interferometer of this embodiment has a basic structure substantially the same as that of the first embodiment. The interferometer of this embodiment also has an improved modification over the first embodiment in which some components including the VCSEL 101, the beam splitter 104 and the photodetector 106 have to be aligned independently prior to being fixed. FIG. 2 has a basic layout in which a VCSEL 201, a first mirror 203 and a photodetector 206 are integrated on the surface of a beam splitter cube 204.

The conventional edge emitting laser has a length of several hundred micrometers (μm) and a width of several micrometers with beams emitted in a longitudinal direction. Thus, like the VCSEL 201 of FIG. 2, the conventional edge emitting laser can be hardly fixed to the surface of a beam splitter without an additional exterior structure. In FIG. 2, the VCSEL 201 is enlarged for the sake of understanding, it is a thin device with a general thickness of about 100 μm. Accordingly, the VCSEL 201 can be surface-mounted on one outer face of the beam splitter cube 204 through flip-chip bonding with solder bumps 202. In addition, a photodiode may be used as the photodetector 206 as a planar device like the VCSEL 201. In this case, the photodetector 206 can be mounted on another face of the beam splitter cube 204.

The first mirror 203 is mounted on an inner face of the beam splitter cube 204 through metal coating or dielectric coating, and the VCSEL 201 is mounted on the outer face of the beam splitter cube 204 that is perpendicular to the mounting face of the first mirror 203. The photodetector 206 is arranged on the face opposite to the mounting surface of the first mirror 203 to be located on the same path. A second mirror 205 is arranged movably on a path of the collimated beam from the VCSEL 201 as in the first embodiment. As an alternative, it is also possible to set the second mirror 205 formed in one inner face of the beam splitter, the VCSEL mounted on an outer surface opposite to the face where the mirror is formed, and the first mirror 203 arranged movably on a path perpendicular to the beam from the VCSEL. The interferometer module of this embodiment can be further miniaturized over that of the first embodiment. The interferometer module of this embodiment also has merits such as short optical path and structural stability since it is integrated into one module.

Figure 3:
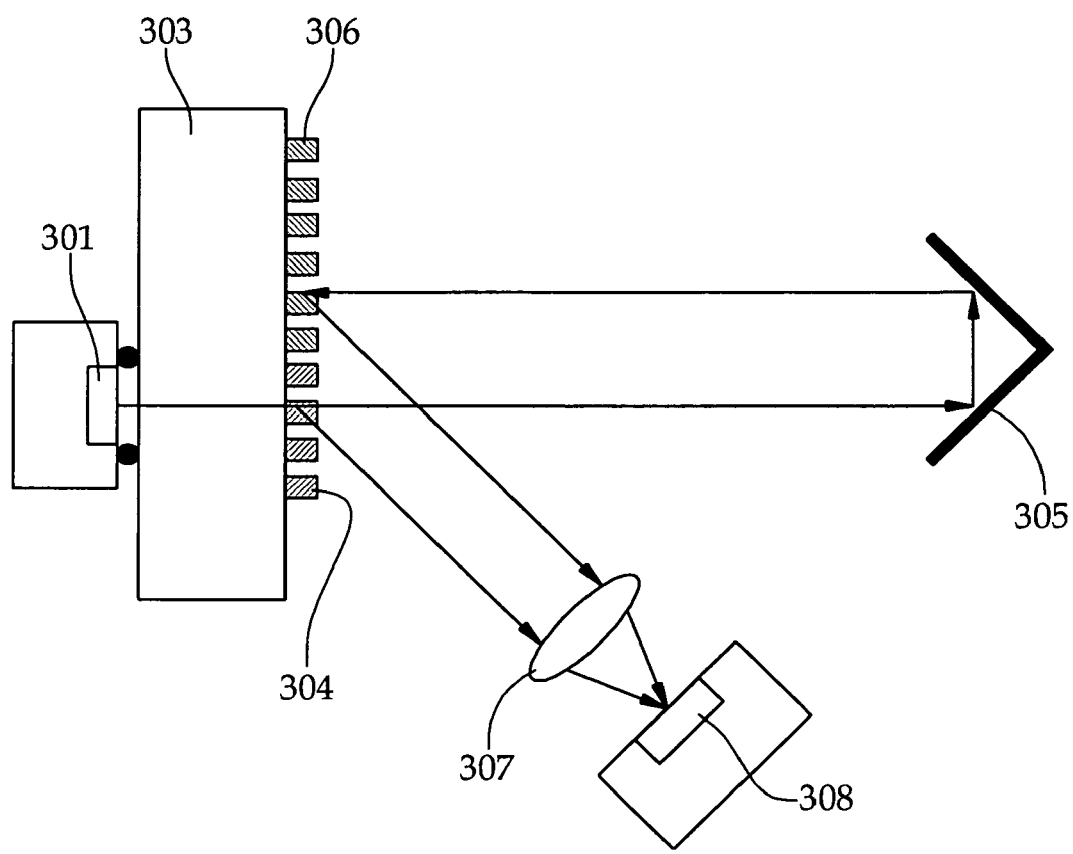
FIG. 3 is a conceptual view illustrating an interferometer according to a third embodiment of the invention.

FIG. 3 illustrates a third embodiment of the invention incorporating a VCSEL 301. In this embodiment, an interferometer module is further simplified by using a grating or DEO in place of the optical path of the first and second embodiments.

A substrate 303 is provided with a transmission grating 304 and a reflection grating 306 arranged on one side thereof. The VCSEL 301 is surface-mounted on one side of the substrate 303 opposite to the grating side since it can be easily surface-mounted. Such an arrangement needs a single optical alignment between the VCSEL 301 and the substrate 303, which also provides a merit of low packaging cost owing to large alignment tolerance.

This arrangement is made so that light starting from the VCSEL 301 passes through the substrate 303 to meet the transmission grating 304. The transmission grating 304 divides the incident light into a zero (0) order beam and a first order-diffracted beam. The configuration and period of the grating determines the strength and angle of the first order-diffracted beam. The first order beam directed straight ahead is reflected from a retroreflector or mirror cube 305, which displaces the incident beam to a predetermined length and then retroreflects it in a direction opposite to the incidence.

The mirror cube 305 reflects the incident beam by displacing it to a predetermined length as shown in FIG. 5 instead of directly reflecting the incident beam as it is so that the reflection beam is directed toward the reflection grating 306.

Light reflected by the mirror cube 305 arrives at the reflection grating 306, which divides the light into zero and first order-diffracted beams. By setting the period of the reflection grating 306 to be the same as that of the transmission grating 306 and adjusting the configuration thereof, it is possible to concentrate light into the first order-diffracted beam. The first order-diffracted beam from the reflection grating 306 advances in parallel with the first order-diffracted beam produced by the transmission grating 304. The two first order-diffracted beams in parallel with each other can generate an interference fringe when collected on the photodetector 308 by means of a lens 307. When the mirror cube 305 is moved, the interference fringe is also varied according to optical path difference. Based on such features, it is possible to fabricate an interferometer having a location precision smaller than the wavelength.

According to the exemplary embodiments of the invention, the single mode VCSEL can be applied to the interferometer in place of the existing He—Ne and edge emitting lasers thereby providing a location sensor which is decreased in the number optical parts in use, miniaturized in size, and reduced in price.

Application of the VCSEL can reduce the light source size to the order of 100 μm×100 μm, which is further miniaturized over the existing He—Ne laser. The VCSEL can also emit a circular beam and thus does not require a sophisticated correction optics that the existing edge emitting semiconductor laser has. A micro-optics can be integrated in the element level, thereby further reducing the size of the module.

The VCSEL of the exemplary embodiments is advantageous in surface-mounting over the edge emitting laser and thus can be fixed to the surface of a beam splitter cube so that all optics necessary for the interferometer can be integrated onto the single beam splitter cube. While the edge emitting laser needs an expensive DBR laser for single wavelength, the VCSEL can realize a single mode relatively easily in an inexpensive price.

As in this disclosure, the interferometer composed of two elements including the VCSEL and the DOE can be realized by combining the characteristics of the VCSEL that can be easily mounted and of the DOE. This interferometer is realized through single optical alignment of parts with an alignment tolerance larger than those of the existing interferometers. The simplified structure saves manufacturing cost significantly over the existing interferometers while enabling miniaturization.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. An interferometer comprising:
 a transparent substrate having a transmission grating and a reflection grating arranged on one side thereof, each of the transmission and reflection gratings adapted to form a zero order beam advancing straight and a first order beam diffracted at a predetermined angle;
 a single mode vertical-cavity surface-emitting laser for generating a beam of light perpendicular to a wafer, the vertical-cavity surface-emitting laser surface-mounted on the other side of the transparent substrate so that a portion the beam passes through the transmission grating of the substrate;
 a mirror cube movably arranged on a path of the beam portion to displace the zero order beam transmitted through the transmission grating to a predetermined length in parallel and reflect the replaced zero order beam toward the reflection grating, wherein the mirror cube is configured to be moved in a direction perpendicular to the one side having the transmission grating and the reflection grating; and
 a photodetector arranged on paths of the first order beams from the transmission grating and from the reflection grating to detect the first order beam reflected from the mirror cube and diffracted by the reflection grating of the substrate and the first order beam diffracted by the transmission grating thereby locating the mirror cube based on an interference fringe created by a difference in optical paths of the two first order beams.

2. The interferometer according to claim 1, wherein the transmission grating and the reflection grating are arranged to have a same period so that the first beams directed toward the photodetector are set parallel with each other.

3. The interferometer according to claim 1, wherein the path of the first order beam from the transmission grating toward the photodetector is parallel to the path of the first order beam from the reflection grating toward the photodetector.

* * * * *